Patented Feb. 2, 1954

2,668,101

UNITED STATES PATENT OFFICE 2,668,101

METHOD OF PREPARING MIXTURES OF HYDROGEN AND CARBON OXIDES

Melvin R. Arnold and Henry M. Baugh, Louisville, Ky., assignors, by mesne assignments, to National Cylinder Gas Company, Chicago, Ill., a corporation of Delaware No Drawing. Application January 21, 1949, Serial No. 72,086

11 Claims. (Cl. 48—196)

This invention relates to an improved method of producing mixtures of hydrogen and carbon oxides from hydrocarbons. More particularly, the invention is concerned with the manufacture of mixtures of hydrogen and carbon oxides by reacting hydrocarbons of higher molecular weight than methane with suitable oxygen-containing gases at elevated temperatures and in the presence of a catalyst.

Processes for converting mixtures of hydrocarbon and oxygen-containing gases into mixtures of hydrogen and carbon oxides are commonly known in the art as "hydrocarbon reforming" processes and it will be understood that the term is so employed in the following description of our invention and in the appended claims. Similarly it will be understood that "reforming catalysts" are those materials which are capable of accelerating the production of hydrogen and carbon oxides from mixtures of hydrocarbons and oxygen-containing gases and the said term is so employed in the following description and in the claims.

Oxygen-containing gases which heretofore have been employed in hydrocarbon reforming operations are steam, carbon dioxide, air, and oxygen. The considerations which in the past have determined which of these gases or mixtures of these gases should be employed are likewise applicable to the method of the present invention, and it is to be understood that the term "oxygen-containing gas" as employed in the present specification and the appended claims refers to those gases, or mixtures thereof, selected from the group specifically mentioned above.

In the hydrocarbon reforming processes which heretofore have enjoyed appreciable commercial success when methane or methane-rich natural gases have been employed, the hydrocarbon gas is mixed with a suitable oxygen-containing gas, and the resulting gaseous mixture is passed through a heated, catalyst-filled zone wherein the temperature of the mixture is increased to that desired for carrying out the reaction between the hydrocarbon and the oxygen-containing gas, generally between 1200° and 2000° F. The hot gases leaving the catalyst zone contain hydrogen and carbon oxides. Various catalysts have been proposed for the purpose, including nickel bearing catalysts which are frequently employed because of their activity in promoting the reforming operation. Particularly active catalysts are those comprising nickel deposited on or mixed with an alumina carrier. The catalyst is usually contained in an elongated externally heated chamber or reactor tube constructed of an alloy capable of withstanding the reaction temperatures. Normally a plurality of such reactor tubes are employed in parallel to provide the desired capacity.

For commercial practicability, the hydrocarbon reforming operation must be capable of substantially continuous operation. In order for this to be possible it is important that no appreciable quantities of carbon be formed by thermal cracking of the hydrocarbons and deposited on the catalyst during the reaction between the hydrocarbon gases and the oxygen-containing gases. Deposition of carbon in the catalyst zone results in decreased efficiency of the catalyst and an increase in pressure drop over the catalyst zone, thus necessitating increased pressure to force the reactant gases through the system. Ultimately the reforming operation must be stopped until the carbon is removed from the catalyst or the catalyst is replaced. Such shut-downs are undesirable since considerable production time is lost.

Apparently because of the molecular structure of methane, it is relatively stable and resistant to cracking at elevated temperatures and therefore little difficulty with carbon deposition has been experienced in the commercial reforming of methane employing the well-known procedure hereinabove described. However, presumably because of the carbon-carbon linkages characterizing hydrocarbons of higher molecular weight than methane, the higher hydrocarbons tend to crack as they approach the reforming temperatures, thereby causing appreciable deposition of elemental carbon on the catalyst. This cracking and carbon deposition has been observed even during reforming of methane-rich gases in which relatively small quantities of higher hydrocarbons are present.

Some investigators have attributed the objectionable deposition of carbon to the presence of olefins in the feed gases and have attempted to solve the problem by preliminarily hydrogenating the hydrocarbon feed gases. The inefficiency of this procedure is apparent, and in addition it has been found that carbon continues to deposit despite the hydrogenation of the feed gases.

Still another approach to the problem has involved the removal of carbon from the catalyst at frequent intervals by discontinuing the flow of hydrocarbon gases and passing steam or air, or a combination of the two, through the catalyst bed at elevated temperatures. This procedure is objectionable in that production is necessarily decreased by the periodic interruptions in the process, the efficiency of the catalyst is adversely affected by the frequent contact with steam and air, and complete removal of the carbon is difficult to accomplish.

It also has been proposed to eliminate the deposition of carbon by causing the gases entering the catalyst zone to pass over a nickel catalyst of lower activity than the usual active nickel reforming catalysts before bringing the gases into contact with the more active reforming catalyst. Although, generally speaking, this process has been the most satisfactory heretofore employed, difficulty has been experienced with disintegration and powdering of the less active catalyst. This phenomenon which is associated with carbon deposition has necessitated periodic interruptions in the operation for the purpose of replacing the catalyst.

We have discovered that by employing the method hereinafter described we are able to reform hydrocarbons of higher molecular weight than methane with greater efficiency and with substantially less deposition of carbon than has heretofore been possible in processes in which the reactant gases are passed directly into contact with one of the more active reforming catalysts. The advantages of our method are particularly remarkable in the reforming of hydrocarbons of higher molecular weight than methane and containing less than 6 carbon atoms per molecule. For example, in the reforming of this latter group of hydrocarbons we have been able to reduce the carbon deposition to such an extent that periodic steaming is unnecessary and, in addition, no difficulty is experienced with disintegration and powdering of the contact materials employed. Thus we are able to substantially reduce the frequency of the periodic interruptions for replacement of catalyst which are often necessary in the operation of the above-described process involving the preliminary passage of the reactant gases over a nickel catalyst of relatively low activity, thereby achieving a much higher efficiency of operation.

It is, therefore, the general object of the present invention to provide an improved method for producing gaseous mixtures containing hydrogen and carbon oxides by reforming hydrocarbons of higher molecular weight than methane.

A further object of the invention is to provide a continuous method for producing gaseous mixtures containing hydrogen and carbon oxides, including reacting a mixture of an oxygen-containing gas and a hydrocarbon gas of higher molecular weight than methane in the presence of a catalyst at elevated temperatures, in which the frequency of interruptions of the operation for purposes of removing carbon from the catalyst or replacement of the catalyst is substantially less than in reforming processes heretofore employed.

A still further object is the provision of a procedure for preventing the deposition of appreciable quantities of carbon on the reforming catalyst during the production of mixtures of hydrogen and carbon oxides by the catalytic reforming of hydrocarbons of higher molecular weight than methane.

Briefly stated, our method of attaining the above objects involves passing the reactant gases in contact with a heated mass of material comprising alumina, and being substantially free of iron and nickel, immediately prior to bringing the gases into contact with the catalyst employed to accelerate the reforming reaction. This heated mass hereinafter will be referred to as "preheat material" in order to distinguish it from the active reforming catalyst which we employ, and to indicate one of its important functions in our improved method. Various arrangements of the preheat material and catalyst which make possible the preliminary passage of the gases in contact with the preheat material may be employed. Preferably the preheat material and the catalyst are arranged in immediately adjacent, elongated layers or zones which are relatively small in cross-section. For example, a reactor tube of the type described above in connection with the known commercial methods of reforming methane may be partially filled with active reforming catalyst, the remaining portion of the tube between the catalyst and the entrance to the tube being filled with the preheat material in such a manner that the reactant gases contact the preheat material before contacting the active reforming catalyst. It is thus possible to adapt existing reforming apparatus to the use of our improved method.

We have observed that in previous attempts to reform hydrocarbons of higher molecular weight than methane in which the reactant gases enter the reforming catalyst zone at temperatures substantially below that at which the desired reaction begins to take place at an appreciable rate, particularly extensive cracking of the hydrocarbon and deposition of carbon occur in the catalyst mass near the entrance to the catalyst zone. Presumably, this is attributable to the fact that the reactant gases must pass some distance through the heated catalyst mass before they reach reforming temperatures, and during this preheating period in the presence of the reforming catalyst extensive cracking occurs.

It is an important feature of the method of our invention that the reactant gases are not brought into contact with the catalyst until the gases are at a temperature at least sufficiently high to cause the reforming reaction to proceed readily in the presence of a catalyst for the reaction. As will be appreciated by those familiar with reforming operations this temperature may vary depending, for example, on the nature of the hydrocarbon and oxygen-containing gases employed and their relative proportions in the gaseous reaction mixture. In general, for purposes of the method of our invention, the gases are at a temperature of at least about 1100° F. before being brought into contact with the reforming catalyst. The reactant gases are heated up to this temperature during passage of the gases through the layer of preheat material which is maintained at elevated temperatures by means of an external source of heat. Although during this preheating period the reactant gases are within the range of temperatures at which excessive deposition of carbon in the catalyst bed heretofore has been experienced, we have discovered that no appreciable carbon deposition takes place in the preheating zone if preheat material of the compositions generally indicated above and hereinafter more specifically described are employed.

Suitable preheat materials for use in our method comprise alumina and must be substantially free of iron and nickel. We have found that the presence of iron or nickel in combined or elemental form in the preheat material causes the deposition of carbon in the preheat zone which it is one of our specific objects to avoid. Substantially pure alumina in the form of pellets or in other form suitable for effective contact with the reactant gases is the simplest illustration of such preheat materials. Various other substances may be present with the alumina as naturally occurring impurities, or may be incorporated either in chemical combination or mechanical admixture with the alumina by methods familiar to those skilled in the art. We have obtained particularly good results with compositions comprising alumina with chromium, chromium oxide, molybdenum oxide, or calcium fluoride. Of course, it will be realized that the nature and quantities of these other substances must not be such as to cause the preheat material to lack the physical strength and resistance to elevated temperatures which are essential to the continuous operation of our method. Preferably the preheat material should contain a predominant proportion of alumina.

In addition to the alumina pellets referred to above we have employed mixtures of alumina and chromium with excellent results. One such preheat material was prepared by pelleting a mixture of 40–60 mesh alumina and chromium powders. The resulting pellets contained 3.9% chromium by weight. Chromium may be incorporated with the alumina as an oxide instead of as metallic chromium. For example, alumina pellets which had been heated to 1400° F. were soaked in a hot saturated solution of ammonium dichromate for 30 minutes. After draining, the pellets were heated at 1300° F. for three hours during which the ammonium dichromate was decomposed to chromium oxide. The chromium oxide content of the resulting pellets was about 16% by weight calculated as chromium oxide.

A preheat material containing molybdenum oxide was prepared in a manner analogous to that described above for preparing the alumina-chromium oxide material. Alumina pellets were first heated to about 1200° F. and then were immersed in a saturated solution of ammonium molybdate heated to about 95° C. for about one hour. After draining, the pellets were heated at 1300° F. for three hours. The resulting pellets contained 12.4% molybdenum.

Still another preheat material which we have employed to advantage consists of an intimate mixture of alumina and calcium fluoride. In preparing this material alumina pellets were heated to 1400° F. and then were immersed in a saturated solution of potassium fluoride for about 30 minutes. After removal from the potassium fluoride solution, the pellets were drained and immersed in a saturated solution of calcium chloride for about one hour to effect the necessary ion exchange. The preheat material obtained by this procedure contained 9.05% calcium fluoride by weight.

In the catalyst layer immediately following the layer of preheat material in the path of the reactant gases we may employ any of the well-known catalysts which are capable of efficiently converting mixtures of hydrocarbons and oxygen-containing gases into hydrogen and carbon oxides. It is preferable to use catalysts of the more active type, particularly those containing nickel, in order to minimize the necessary volume of the catalyst or reaction zone. Of the numerous active reforming catalysts available we have obtained particularly good results with catalysts comprising nickel deposited on or mixed with alumina as a carrier. Such catalysts have been widely employed in producing hydrogen and carbon oxides from methane, and the compositions thereof form no part of the present invention. In accordance with our method the layer of catalyst is maintained at sufficiently high temperatures by means of an external source of heat that the gases are heated to temperatures of between 1200° and 2000° F. during the reforming reaction. We have obtained particularly good results by maintaining temperatures in the catalyst zone of between 1400° and 1800° F.

The optimum ratio of volume of preheat material to volume of catalyst depends on a large number of factors such as temperature of operation, rate of heat transfer, velocity of gases, the nature of the reactants, and the activity of the catalyst. The prime consideration in the selection of this ratio is that the reactant gases must be heated by contact with the preheat material to temperatures at which the reforming reaction between the hydrocarbons and the oxygen-containing gases proceeds readily when the gases initially contact the catalyst. Preferably the gases should be at a temperature of about 1100° F. before they enter the catalyst layer. It is also of importance that the ratio of the volume of preheat material to the volume of catalyst be as small as possible consistent with the accomplishment of the above objective, so that high production of mixtures of hydrogen and carbon oxides can be obtained with reasonably compact apparatus. In general the ratio of preheat material to catalyst is about 1 to 3. Thus where the reforming operation is carried out in an externally heated reactor tube of the type previously described, the lower three-fourths of the tube is filled with catalyst and the upper fourth is filled with the preheat material, the reactant gases entering the tube at the top and the mixture of hydrogen and carbon oxides leaving at the bottom of the tube.

In order that those skilled in the art better may understand how the invention herein described may be practiced, the following example is given:

A mixture of propane and steam in the ratio of 8.1 mols of steam per mol of propane was passed through an externally heated reactor tube at a space velocity of 500. For purposes of the present specification space velocity is defined as the standard cubic feet of hydrogen and carbon monoxide theoretically produced per cubic foot of catalyst per hour, assuming all of the hydrocarbon converted to hydrogen and carbon monoxide. The lower three-fourths of the reactor tube was filled with pellets of an active reforming catalyst consisting of nickel deposited on alumina. The upper fourth of the tube was filled with a pelleted preheat material consisting of alumina and chromium oxide of the composition hereinabove described. During passage of the gases through the reactor tube, the gases attained a reaction temperature of about 1700° F. in the catalyst zone. The product gases contained only very small amounts of unconverted hydrocarbons. The run was arbitrarily discontinued after about 100 hours. Upon analysis of the preheat material and the catalyst at the conclusion of the run it was found that the carbon which had deposited on both materials amounted to only 0.3% of the total carbon in the propane passed through the reactor tube during the run. The conversion efficiency as calculated from the following formula was 98.9%.

Percent conversion =

$$\left\{ \frac{\text{Carbon on preheat material and catalyst plus}}{\text{Carbon in inlet hydrocarbons}} \right\} \times 100$$

Under the same conditions as described in the above example, a series of runs was made employing hydrocarbons other than propane. The results of these runs, as well as the results of the run described in the above example are given in the following table:

Table I

| Hydrocarbon | Mols Steam per Mol Hydrocarbon [1] | Carbon Deposited (Percent) | Conversion (Percent) | Length of Run (Hrs.) |
|---|---|---|---|---|
| Propane | 8.1 | 0.3 | 98.9 | 100.8 |
| n-Butane | 12.4 | 0.3 | 96.5 | 98.5 |
| i-Butane | 13.1 | 0.1 | 99.0 | 98.8 |
| n-Pentane | 15.1 | 0.3 | 95.9 | 115.0 |
| Propylene | 7.7 | 0.4 | 98.9 | 97.0 |
| 2-Butene | 12.2 | 0.4 | 98.9 | 95.5 |
| n-Octane | 21.1 | 0.4 | 97.8 | 100 |
| Cyclohexane | 17.5 | 0.1 | 98.9 | 143 |
| Toluene | 19.5 | 0.3 | 99.2 | 100 |
| Straight Run Gasoline (ASTM Dist. 121°–398° F.) | 20.8 | 0.4 | 98.2 | 206 |

[1] Ratio of steam to hydrocarbon was varied substantially in proportion to carbon atoms per molecule of the various hydrocarbons.

During the course of the reforming operation, the results of which are set forth in the above table, no increase in the pressure required to force the gases through the reactor tube nor decrease in the efficiency of conversion of the mixture of the respective hydrocarbons and steam into hydrogen and carbon oxides was observed. The runs were stopped at the end of the periods indicated in the last column of the table to permit the examination of the preheat material and catalyst. The small amount of carbon found on the preheat material and catalyst was deposited at or near the beginning of each run and did not increase as the reforming operations continued. There was, in no case, any indication that the carbon which had been deposited had caused powdering or disintegration of either the preheat material or the catalyst.

Another run was made using butane as the hydrocarbon gas under conditions substantially the same as those maintained during the runs described above with the exception that the reactor tube was entirely filled with the nickel reforming catalyst. In other words, the mixture of butane and steam was brought directly into contact with the heated catalyst at the entrance of the reactor tube and was heated up to reforming temperatures during passage through the upper portion of the catalyst bed near the entrance to the reactor tube. As the run proceeded carbon was continuously deposited on the catalyst in the reactor tube. The catalyst bed rapidly became plugged and, as a result, the pressure necessary to force the gases through the tube increased greatly. In addition the efficiency of the conversion of the reactant gases into hydrogen and carbon oxides rapidly decreased. After only about 20 hours it became necessary to stop the operation. Upon analysis of the catalyst it was found that 2.7% of the carbon in the butane passed through the reactor tube had been deposited on the catalyst in the form of elemental carbon. The poor results obtained in the run just described as compared with the results of the runs set forth in Table I clearly demonstrate the advantages which are realized by the use of the method of our invention in the reforming of hydrocarbons of higher molecular weight than methane.

In a still further series of reforming operations, gaseous mixtures of straight run gasoline (ASTM Dist. 121°–398° F.) and steam were converted into mixtures of hydrogen and carbon oxides, employing a nickel-containing catalyst of the same type and the same operating conditions as were used in the runs described above. In each of these runs, the results of which are set forth in Table II, below, one of the preheat materials specifically described previously in this specification was employed.

Table II

| Preheat Material | Mols Steam per Mol Gasoline [1] | Carbon Deposited (Percent) | Length of Run (Hrs.) |
|---|---|---|---|
| $Al_2O_3$ | 18.8 | 0.9 | 91 |
| $Al_2O_3$ and Chromium | 22.0 | 0.3 | 126 |
| $Al_2O_3$ and Molybdenum Oxide | 19.8 | 0.6 | 195 |
| $Al_2O_3$ and Calcium Fluoride | 15.2 | 0.4 | 85 |

[1] Based on average carbon content of about 7.5 carbon atoms per molecule.

There was no noticeable increase in pressure drop over the layers of preheat material and catalyst as the runs covered by Table II proceeded, the runs being discontinued at the end of the periods indicated to permit examination of the preheat material and catalyst. In no case was there any signs of powdering or disintegration of either the preheat material or the catalyst and, as indicated in the table, the amount of carbon deposited during the runs was negligible. The exact conversion efficiencies realized during the runs are not shown in the table. However, in each case they were of the order of the efficiencies obtained during the series of runs referred to in Table I.

Disintegration and powdering of the catalyst are manifested in reforming operations by the undesirable increase in pressure required to force the reactant gases through the catalyst bed. This increase in pressure is attributable to the tendency of the finely divided particles of catalyst which separate from the original larger pieces or pellets to fill the normal passages and interstices in the catalyst layer. We have observed that the objectionable disintegration and powdering of catalysts during hydrocarbon reforming operations frequently are coincident with the deposition of excessive quantities of carbon on the catalyst. The following series of tests indicate that there is good reason to believe that carbon deposition contributes greatly to such physical breakdown of the catalyst.

A catalyst consisting of nickel thoroughly distributed in hydraulic cement was subjected to a temperature of 1700° F. while a stream of nitrogen was conducted over it. No change in the physical characteristics of the catalyst resulted. The same catalyst was heated to 1700° F. and steam was passed over it for an extended period. Again no noticeable change in the physical characteristics of the catalyst was observed. In a third operation propane was passed over the catalyst which was maintained at a temperature of 850° F. Examination of the catalyst revealed that a substantial quantity of carbon was deposited in and on the catalyst and much of the catalyst had been appreciably reduced in size as a result of disintegration and powdering. Thus, although the catalyst withstood exposure to elevated temperatures and contact with steam and an inert gas, it tended to disintegrate and powder even at substantially lower temperatures when carbon was deposited thereon as a result of contact with the hydrocarbon gas.

In our improved method, the quantity of carbon deposited in the catalyst layer is too small to induce physical breakdown of catalysts which otherwise are suitably resistant to the elevated temperatures and passage of the reactant gas. This is demonstrated by the fact that, even after extended periods of uninterrupted operation, there is no noticeable increase in pressure drop over the layers of preheat material and catalyst.

By way of further illustrating the marked advantages which may be realized in the use of the improved method herein disclosed, reference is made, for purposes of comparison, to two commercial reforming operations, both employing apparatus of the type illustrated in United States Reissue Patent No. 21,521. In the first operation the externally heated reactor tubes of the apparatus were completely filled with reforming catalyst of the type containing nickel. A mixture of propane and steam was fed to the reactor tubes at a sufficient rate to provide 300,000 standard cubic feet of hydrogen per day. During passage of the gases through the heated reactor tubes they attained temperatures of 1600°–1800° F. Carbon deposited on the catalyst at an appreciable rate accompanied by a continuous and substantial increase in pressure drop over the catalyst bed. Periodically the reforming operation was stopped and steam was passed through the reactor tubes to remove the carbon. After several months of such intermittent operation the catalyst, particularly that near the entrance to the catalyst zone, had disintegrated and powdered to such an extent that the increased pressure drop became excessive and it was necessary to discontinue the operation. In addition, the efficiency of the catalyst had greatly decreased so that it was impossible to produce hydrogen of the required purity at the desired rate.

After the reforming operation described above was discontinued, the catalyst was removed from the reactor tubes. The lower three-fourths of each of the tubes then was filled with pellets of active reforming catalysts consisting of nickel deposited on alumina and the remaining one-fourth was filled with a preheat material of the type hereinabove described. More specifically, the preheat material was in the form of pellets and consisted of a mixture of alumina and chromium oxide, the chromium oxide representing about 13% by weight of the material. A mixture of propane and steam of substantially the same composition as the gaseous mixture fed to the reforming operation described above was fed to the reactor tubes in the present instance. The gases were preheated to reforming temperatures, i. e., above about 1100° F., during passage through the layers of preheat material in the tubes before entering the catalyst layers. As in the first discussed commercial operation, the gases were heated to 1600°–1800° F. in the catalyst layers during conversion of the mixture of propane and steam into hydrogen and carbon oxides. After continuous operation for nearly double the length of time of operation of the first described commercial operation, the preheat material and catalyst in the reactor tubes had remained substantially free of carbon deposits and it was therefore unnecessary to interrupt the operation to permit passage of steam alone through the reactor tubes. In addition there was no indication of powdering or disintegration of the preheat material or catalyst as evidenced by the fact that there was no noticeable increase in pressure drop over the reactor tubes during the operation of the plant. In connection with the last mentioned commercial application of the method of our invention it was particularly interesting to note that, contrary to expectations, the reduction in the amount of reforming catalyst by replacing a portion of the catalyst with the preheat material resulted in an increase rather than a decrease in the capacity and conversion efficiency of the apparatus.

We claim:

1. In the continuous process for the production of hydrogen and carbon oxides by reforming hydrocarbons of higher molecular weight than methane by passing said hydrocarbons mixed with an oxygen-containing gas over an externally heated reforming catalyst maintained at a reforming temperature within the range of 1200° to 2000° F., there being present sufficient oxygen-containing gas to convert substantially all of the hydrocarbons into hydrogen and carbon oxides, the improvement of advantageously inhibiting significant cracking of said hydrocarbons with attendant deposition of carbon on said reforming catalyst, comprising the step of: raising the temperature of the reactant gases to the reforming temperature prior to their contact with the heated reforming catalyst by passing said gases over an externally heated mass of preheated material comprising alumina and which is free of iron and nickel, said preheat material being substantially devoid of catalytic reforming activity.

2. The process of claim 1 in which said catalyst contains nickel.

3. The process of claim 1 wherein said preheat material comprises alumina and chromium and is substantially free of iron and nickel.

4. The process of claim 1 wherein said preheat material comprises alumina and chromium oxide and is substantially free of iron and nickel.

5. The process of claim 1 wherein said preheat material comprises alumina and molybdenum oxide and is substantially free of iron and nickel.

6. The process of claim 1 wherein said preheat material comprises alumina and calcium fluoride and is substantially free of iron and nickel.

7. The process of claim 1 wherein said oxygen-containing gas comprises steam.

8. The process of claim 1 wherein said oxygen-containing gas comprises carbon dioxide.

9. In the continuous process for the production of hydrogen and carbon dioxides by reforming hydrocarbons of higher molecular weight than methane by passing said hydrocarbons mixed with an oxygen-containing gas over an externally heated reforming catalyst maintained at a reforming temperature within the range of 1200° to 2000 F., there being present sufficient oxygen-containing gas to convert substantially all of the hydrocarbons into hydrogen and carbon oxides, the improvement of advantageously inhibiting significant cracking of said hydrocarbons with attendant deposition of carbon on said reforming catalyst, comprising the step of: raising the temperature of the reactant gases to a temperature not less than about 1100° F. prior to their contact with the heated reforming catalyst by passing said gases over an externally heated mass of preheat material comprising alumina and free of iron and nickel, said preheat material being substantially devoid of catalytic reforming activity.

10. A process according to claim 9, wherein the hydrocarbons comprise propane.

11. A process according to claim 9, wherein the hydrocarbons comprise a hydrocarbon of higher molecular weight than methane and having less than 6 carbon atoms.

MELVIN R. ARNOLD.
HENRY M. BAUGH.

References Cited in the file of this patent

UNITED STATES PATENTS

| Number | Name | Date |
|---|---|---|
| 1,903,845 | Wilcox | Apr. 18, 1933 |
| 1,904,592 | Young et al. | Apr. 18, 1933 |
| 1,951,774 | Russell et al. | Mar. 20, 1934 |
| 2,056,911 | Schiller et al. | Oct. 6, 1936 |
| 2,230,467 | Nelly et al. | Feb. 4, 1941 |
| 2,462,891 | Noll | Mar. 1, 1949 |
| 2,524,840 | Shapleigh | Oct. 10, 1950 |
| 2,565,395 | Scharmann | Aug. 21, 1951 |